US012726744B2

(12) United States Patent
Effenberger et al.

(10) Patent No.: US 12,726,744 B2
(45) Date of Patent: Sep. 1, 2026

(54) INTELLIGENT FIBER TO THE ROOM (FTTR) GATEWAY

(71) Applicant: HUAWEI TECHNOLOGIES CO., LTD., Shenzhen (CN)

(72) Inventors: Frank J. Effenberger, Frisco, TX (US); Yuanqiu Luo, Cranbury, NJ (US)

(73) Assignee: Huawei Technologies Co., Ltd., Shenzhen (CN)

( * ) Notice: Subject to any disclaimer, the term of this patent is extended or adjusted under 35 U.S.C. 154(b) by 272 days.

(21) Appl. No.: 18/509,768

(22) Filed: Nov. 15, 2023

(65) Prior Publication Data

US 2024/0098392 A1 Mar. 21, 2024

Related U.S. Application Data

(63) Continuation of application No. PCT/US2021/032760, filed on May 17, 2021.

(51) Int. Cl.
*H04Q 11/00* (2006.01)

(52) U.S. Cl.
CPC . *H04Q 11/0067* (2013.01); *H04Q 2011/0064* (2013.01)

(58) Field of Classification Search
CPC ...... H04B 10/25; H04B 10/079; H04B 10/27; H04B 10/40; H04B 10/80; H04B 17/318;
(Continued)

(56) References Cited

U.S. PATENT DOCUMENTS 6,577,414 B1 * 6/2003 Feldman ............. H04J 14/0232 398/43
2006/0053309 A1 * 3/2006 Vereen .................. G06F 1/3278 713/300
(Continued)

FOREIGN PATENT DOCUMENTS

WO 2010048193 A2 4/2010

OTHER PUBLICATIONS

Ton Koonen,"Fiber to the Home/Fiber to the Premises:What, Where, and When?," May 31, 2006, Proceedings of the IEEE (vol. 94, Issue: 5, May 2006),pp. 1-22.*
(Continued)

*Primary Examiner* — Omar S Ismail
(74) *Attorney, Agent, or Firm* — Conley Rose, P.C.

(57) ABSTRACT

A method performed by an optical network unit (ONU) gateway connecting an access passive optical network (PON) and a home PON for rerouting in-home traffic data back to the home PON. The method includes receiving, by the ONU gateway, an access PON downstream optical signal from an optical line terminal (OLT). The access PON downstream optical signal includes first access traffic intended for the ONU gateway and second access traffic not intended for the ONU gateway. The ONU gateway also receives a home PON upstream optical signal from an ONU of the home PON. The home PON upstream optical signal includes in-home traffic data and upstream access data. The ONU gateway generates a composite downstream signal that includes the first access traffic intended for the ONU gateway and the in-home traffic data. The ONU gateway transmits the composite downstream signal to all ONUs of the home PON.

20 Claims, 6 Drawing Sheets

(58) Field of Classification Search
CPC .. H04B 10/071; H04B 10/075; H04B 10/077; H04B 17/309; H04B 10/11; H04B 10/297; H04B 10/50; H04B 10/60; H04B 15/00; H04B 17/336; H04B 17/382; H04B 17/391; H04B 5/48; H04B 5/70; G02B 6/42; G02B 6/38; G02B 6/46; G02B 6/26; G02B 6/35; G02B 6/43; G02B 6/25; H04Q 11/00
See application file for complete search history.

(56) References Cited

U.S. PATENT DOCUMENTS

| | | | | |
|---|---|---|---|---|
| 2009/0060530 | A1* | 3/2009 | Biegert | H04Q 11/0067 398/214 |
| 2009/0083813 | A1* | 3/2009 | Dolce | H04N 7/17318 725/93 |
| 2012/0216038 | A1* | 8/2012 | Chen | H04L 9/14 713/168 |
| 2013/0086202 | A1* | 4/2013 | Connelly | G06F 8/61 709/217 |
| 2013/0198796 | A1* | 8/2013 | Brooks | H04N 21/2383 725/129 |
| 2015/0138996 | A1* | 5/2015 | Ince | H04L 43/50 370/252 |
| 2015/0188812 | A1* | 7/2015 | Zheng | H04Q 11/0067 398/45 |
| 2015/0304064 | A1* | 10/2015 | Mutalik | H04B 10/807 398/48 |
| 2017/0264968 | A1* | 9/2017 | Mao | H04N 21/23113 |
| 2017/0324471 | A1* | 11/2017 | Cress | H04J 14/0297 |
| 2019/0173582 | A1* | 6/2019 | Ashrafi | H04B 7/15 |
| 2020/0275517 | A1* | 8/2020 | Ashrafi | H04W 76/22 |
| 2021/0029195 | A1* | 1/2021 | Kolbe | H04L 63/0815 |

OTHER PUBLICATIONS

Fei Deng et al.,"A Smart Gateway Architecture for Improving Efficiency of Home Network Applications," Nov. 29, 2025, Journal of Sensors,vol. 2016, Article ID 2197237,pp. 1-9.*

Björn Skubic et al.,"Introduction to Optical Access Networks," 2020, Part D Optical Access and Wireless Networks,Springer Handbook of Optical Networks. Springer Handbooks. Springer, Cham. https://doi.org/10.1007/978-3-030-16250-4_26,pp. 831-845.*

Frank Effenberger et al.,"PON for Fiber to the Room," Oct. 24-27, 2021,Asia Communications and Photonics Conference 2021, Optica Publishing Group 2021,pp. 1-3.*

Takamitsu Tochino et al.,"Redesigned TDM-PON System Architecture Based on Point-to-Point Ethernet Transmission and Software Processing With General-Purpose Hardware," Sep. 30, 2020, Journal of Lightwave Technology, vol. 39, No. 2, Jan. 15, 2021,pp. 448-455.*

Hantao Huang et al.,"Distributed-neuron-network based Machine Learning on Smart-gateway Network towards Real-time Indoor Data Analytics," Apr. 28, 2016, 2016 Design, Automation & Test in Europe Conference & Exhibition, pp. 720-724.*

Nima Zaker et al.,"Quality-of-Service-Aware Fiber Wireless Sensor Network Gateway Design for the Smart Grid," Oct. 31, 2013, 2013 IEEE International Conference on Communications Workshops (ICC),pp. 863-866.*

E. Tangdiongga et al.,"Accurate Localization Technique for Smart Fiber-Wireless In-House Networks," Jun. 20-20, 2012,Advanced Photonics Congress OSA Technical Digest (online),Optica Publishing Group, 2012, pp. 1-3.*

Thomas Pfeiffer, "29.PON Architecture Enhancements," Optical Access and Wireless Networks, Part D, 29.2,2020 Springer Handbook of Optical Networks,pp. 919-945.*

Gordon C. Wilson et al.,"FiberVista: An FTTH or FTTC system delivering broadband data and CATV services," Aug. 14, 2002, Bell Labs Technical Journal,vol. 4, Issue 2, Spring 1999,pp. 301-315.*

Luo, Y., et al., "G.fin: east-to-west streaming in PON TC," ITU-T Draft; Study Period 2021-2024; Study Group 15; Series C01, International Telecommunication Union, Geneva; CH, vol. 18/15, Oct. 5, 2021 (Oct. 5, 2021), pp. 1-5, XP044320882, Retrieved from the Internet: https://www-api.itu.int/ifa/t/2017/sql5/docs/rgm/Q18-211008/C/T17-SG15RGM-Q18-211008-C-0001.docs, retrieved on Oct. 5, 2021.

* cited by examiner

INTELLIGENT FIBER TO THE ROOM (FTTR) GATEWAY

CROSS-REFERENCE TO RELATED APPLICATIONS

This application is a continuation of International Patent Application No. PCT/US2021/032760 filed on May 17, 2021, by Futurewei Technologies, Inc., and titled "Intelligent Fiber to The Room (FTTR) Gateway," which is incorporated by reference in its entirety.

TECHNICAL FIELD

The present disclosure is generally related to passive optical networks (PONs), and specifically to various systems and methods for providing fiber to the room (FTTR).

BACKGROUND

A passive optical network (PON) is a fiber-optic telecommunications network that delivers high-speed access to end customers. PONs implements a point-to-multipoint topology, in which a single optical fiber serves multiple endpoints by using unpowered (passive) fiber optic splitters to divide the fiber bandwidth among multiple access points.

SUMMARY

A first aspect relates to an optical network unit (ONU) gateway connecting an access PON to a home PON. The optical network unit includes an ONU optical module configured to receive an access PON downstream optical signal from an optical line terminal (OLT). The access PON downstream optical signal includes first access traffic intended for the ONU gateway and second access traffic not intended for the ONU gateway. The optical module is configured to convert the access PON downstream optical signal to an access PON downstream electrical signal. The ONU gateway also includes an OLT optical module configured to receive a home PON upstream optical signal from an ONU of the home PON. The home PON upstream optical signal includes in-home traffic data and upstream access data. The OLT optical module is configured to convert the home PON upstream optical signal to a home PON upstream electrical signal. The ONU gateway also includes an ONU media access control (MAC) chip coupled to the ONU optical module. The ONU MAC chip is configured to receive the access PON downstream electrical signal from the ONU optical module. The ONU MAC chip is configured to filter the access PON downstream electrical signal and remove the second access traffic not intended for the ONU gateway to generate a filtered access traffic signal. The ONU gateway also includes a time-division multiplexing (TDM) switching module having a first input port and a second input port. The first input port is configured to receive the filtered access traffic signal. The second input port is configured to receive the home PON upstream electrical signal. The TDM switching module is configured to receive one or more control signals from the MAC chip to instruct the TDM switching module to select data from one of the first input port or the second input port and generate a composite downstream signal that includes the first access traffic intended for the ONU gateway and the in-home traffic data. The OLT optical module is configured to receive the composite downstream signal, convert the composite downstream signal to a composite downstream optical signal, and transmit the composite downstream optical signal to all ONUS of the home PON.

In a first implementation form of the method according to the first aspect, the control signals from the MAC chip are based on bandwidth allocation control information included in the access PON downstream optical signal from the OLT. The control signals from the MAC chip instructs the TDM switching module to select data from the second input port during a bandwidth timeslot previously allotted to the second access traffic not intended for the ONU gateway in the access PON downstream optical signal, such that the composite downstream signal utilizes the bandwidth timeslot previously allotted to the second access traffic not intended for the ONU gateway for carrying the in-home traffic data.

In a second implementation form of the first aspect as such or any preceding implementation form of the first aspect, the MAC chip receives the upstream access data of the home PON upstream electrical signal, generates an access upstream electrical signal that includes the upstream access data, and outputs the access upstream electrical signal to the ONU optical module. The ONU optical module converts the access upstream electrical signal to an access upstream optical signal, and transmits the access upstream optical signal to the OLT.

In a third implementation form of the first aspect as such or any preceding implementation form of the first aspect, the TDM switching module is implemented using an electronically controlled multiplexer switch, which can electrically connect one of the two input ports to the output port.

In a fourth implementation form of the first aspect as such or any preceding implementation form of the first aspect, the TDM switching module is implemented using a memory buffer having two input ports and one output port, where the two input ports can store data into the memory buffer, and the one output port can read data from the memory buffer.

In a fifth implementation form of the first aspect as such or any preceding implementation form of the first aspect, the memory buffer is organized on whole forward error correction (FEC) codewords, and only whole FEC codewords are stored and read from the two input ports of the memory buffer.

A second aspect relates to a method performed by an ONU gateway connecting an access PON and a home PON for rerouting in-home traffic data back to the home PON. The method also includes receiving an access PON downstream optical signal from an OLT. The access PON downstream optical signal includes first access traffic intended for the ONU gateway and second access traffic not intended for the ONU gateway. The method also includes receiving a home PON upstream optical signal from an ONU of the home PON. The home PON upstream optical signal includes in-home traffic data and upstream access data. The method also includes generating a composite downstream signal that includes the first access traffic intended for the ONU gateway and includes the in-home traffic data. The method also includes transmitting the composite downstream signal to all ONUs of the home PON.

In a first implementation form of the method according to the second aspect, generating the composite downstream signal includes analyzing control information included in the access PON downstream optical signal and utilizing the control information to generate the composite downstream signal, such that the composite downstream signal utilizes a bandwidth timeslot previously allotted to the second access traffic not intended for the ONU gateway for carrying the in-home traffic data.

In a second implementation form of the second aspect as such or any preceding implementation form of the second aspect, generating the composite downstream signal includes controlling a TDM switch to generate the composite downstream signal such that the first access traffic intended for the ONU gateway is selected when the TDM switch is in a first state and the in-home traffic data is selected when the TDM switch is in a second state.

In a third implementation form of the second aspect as such or any preceding implementation form of the second aspect, the method includes transmitting the upstream access data to the OLT.

For the purpose of clarity, any one of the foregoing implementation forms may be combined with any one or more of the other foregoing implementations to create a new embodiment within the scope of the present disclosure. These embodiments and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The disclosed embodiments include an intelligent network gateway between an access PON and a home PON. The intelligent network gateway is able to provide FTTR or to floors (i.e., a complete in-home fiber network) while eliminating the inefficiency of having in-home traffic (i.e., communications between devices in the home) routed all the way back to the OLT and then back to the home. In accordance with the disclosed embodiments, the gateway ONU is intelligently controlled so that when there is access PON traffic needed by the ONUS in the home PON, the gateway ONU lets the access PON traffic through. But, when there is no access PON traffic, then the gateway ONU can send the in-home traffic from the home PON upstream signal back into the home PON. It is during these times when one ONU in the home PON can communicate with other ONUS in the home PON. The local in-home PON traffic essentially pre-empts the downstream signal.

One issue with PONs is that the capacity of the access network is generally greater than the capacity of the customer's in-home or in-office network (e.g., going from an optical access network to a coaxial and/or ethernet network at the customer's premises). The customer's in-home or in-office network thus reduces the efficiency of the overall network. Applying passive optical networking concepts to build a FTTR style network addresses this shortfall.

Figure 1:
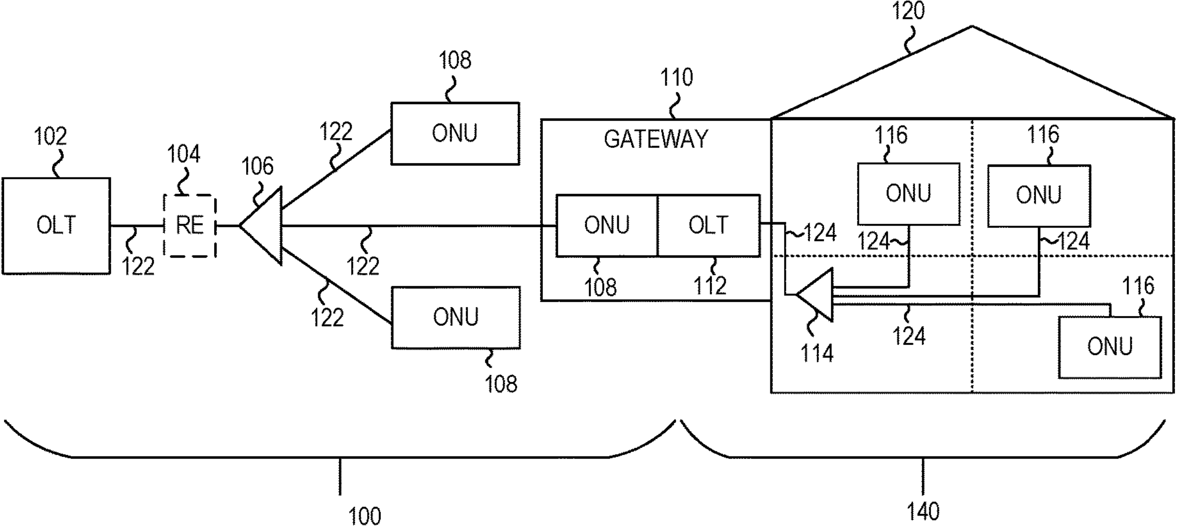
FIG. 1 is a diagram illustrating a short reach PON FTTR network in accordance with an embodiment of the present disclosure.

FIG. 1 is a diagram illustrating a PON FTTR network 140 (or home PON 140) in accordance with an embodiment of the present disclosure. In the depicted embodiment, an access PON network 100 delivers high speed access to a customer location 120 and the home PON 140. The access PON network 100 is a fiber-optic network utilizing a point-to-multipoint topology and an optical splitter(s) to deliver data from a single transmission point to multiple user endpoints, including to the customer location 120 and the home PON 140. The access PON network 100 can support various PON standards, such as but not limited to, Gigabit Passive Optical Network (GPON) and Ethernet Passive Optical Network (EPON). The access PON network 100 includes an OLT 102 and one or more ONUS 108 (also commonly referred to as optical network terminals (ONTs)) located near the end users, such as at the customer location 120. An Optical Distribution Network (ODN) provides the optical transmission medium (e.g., the fiber optic cables 122, one or more optional reach extenders (REs) 104, one or more unpowered (passive) fiber optic splitters 106, and auxiliary components that collaborate with each other) for the physical connection of the ONUS 108 to the OLT 102.

The OLT 102 is the starting point of the access PON network 100 and is located at a service provider's central office (CO) (not shown). The primary function of the OLT 102 is to convert, frame, and transmit signals from the service provider downstream to the ONUS 108 (e.g., distributing data, voice, and video traffic from one or more Internet protocol (IP) networks to the customer location 120). Additionally, the OLT 102 coordinates the ONUS 108 and performs or controls multiplexing for the shared upstream transmission (e.g., receiving various types of data and/or voice traffic from end-users). The OLT 102 signals travel over the access PON network 100 to the home to the ONUs 108 (and to the customer location 120). Depending on the distance between the OLT 102 and the ONUs 108, one or more REs 104 may be employed in the access PON network 100. A RE 104 is a physical layer reach extension device, such as a regenerator or optical amplifier in the fiber link between the OLT 102 and the ONUs 108, and can be employed for extending the reach of the optical signal. The single downstream signal from the OLT 102 is split using the passive fiber optic splitter 106 into multiple signals, with each signal being routed to one of the ONUs 108. The ONUs 108 convert the optical signals received from the OLT 102 to electrical signals. The ONUs 108 can also optimize and reorganize different types of data coming from the customer location 120 to increase efficiency of delivery of the upstream data to the OLT 102.

The OLT 102 informs the ONUs 108 of the upstream bandwidth allocation by transmitting a Bandwidth Map (BWMAP) that indicates bandwidth allocations (i.e., grants) for the individual ONUs 108. Each bandwidth allocation is an indication to an ONU 108 to transmit in a defined time slot. The OLT 102 can dynamically calculate the BWMAP to allocate the right bandwidth for each ONU 108 to tailor bandwidth delivery based on service requirements and subscriber needs. For International Telecommunication Union (ITU) PONs, there is one BWMAP per frame. For Institute of Electrical and Electronics Engineers (IEEE) PON, the BWMAP is distributed over control packets.

In the depicted embodiment, at the customer location 120, a gateway device 110 connects the access PON network 100 (via the ONU 108) to the home PON 140 (via an OLT 112). The customer location 120 can be any type of building such as, but not limited to, a single-family home, a multi-family home (e.g., townhome duplexes and apartment buildings), an office building, school building, or a hotel. The home PON 140 is a short reach (SR) PON fiber-to-the-room (FTTR) or fiber-to-the-floor (FTTF) network. Similar to the access PON network 100, the home PON 140 includes the OLT 112 connected to one or more ONUS 116 (i.e., internal ONUS 116) via a home ODN. The home ODN includes fiber lines 124 and one or more passive fiber optic splitters 114. The ONUS 116 serve individual rooms or floors of the customer location 120 (as illustrated by the dotted lines), with each room or floor receiving service via a different ONU 116.

In an embodiment, the home ODN can use either a single strand of conventional single mode fiber or multimode fiber for the fiber lines 124. In an embodiment, when the customer location 120 has structured wiring, which means that there is a central termination block that accepts cables from outside providers and distributes the signals directly to each room in the home/building, all room drop fibers go to the central termination block, where the passive fiber optic splitter 114 is placed. The common fiber from the passive fiber optic splitter 114 can then be routed to wherever the fixed access services enter into the customer location 120 (i.e., to the gateway device 110). In many locations, the wiring center is not immediately next to the building access. For buildings that have unstructured wiring (i.e., no central termination block), the home PON 140 can be arranged in a variety of ways: multi-stage splitting, tap-and-drop, or a combination of the two.

As shown in FIG. 1, the most straightforward way to implement the gateway device 110 is to connect the ONU 108 (facing the access PON network 100) to the OLT 112 (facing the home PON 140). In one embodiment, the data traffic received by the ONU 108 from the access PON network 100 is decoded and filtered by the ONU 108 to isolate the traffic intended for the ONU 108. The decoded and filtered data is then passed to the OLT 112. The OLT 112 then has to completely re-encapsulate the data in the PON protocol to serve the home PON 140. This process creates a rather complex device, and would require a lot of provisioning actions to activate. Moreover, the embedded OLT 112 would have to use existing OLT semiconductor implementations. These tend to be much more costly than the ONU 108 devices. So, building the gateway device 110 in this manner may not be economically feasible.

In an alternative embodiment, the gateway device 110 does not perform the task of decoding and re-encapsulating the data received from the OLT 102. Instead, the downstream signal from the OLT 102 would simply be regenerated and passed along to the ONUs 116, similar to the task performed by a mid-span Optical-Electrical-Optical (OEO) reach extender. The ONUs 116 performs the tasks of decoding and filtering to isolate the traffic intended for the ONUs 116. Since the ONUs 116 normally have to perform signal processing, this does not increase the cost of the ONUs 116. The upstream repeater in the ONU 108 of the gateway device 110 would have to emulate the burst mode operation of the ONUs 116 by turning on only when its subtending ONUs turn on. As an example, the upstream repeater can emulate the burst mode operation of the ONUs 116 using a power detector to detect when its subtending ONUs turn on. Alternatively, in other circumstances, the OLT 102 could command the ONU 108 of the gateway device 110 when to turn its transmitter on.

One issue with the above alternative embodiment is that in the home PON 140, there is going to be a lot of local traffic going from room to room. For instance, security cameras, home digital video recorder (DVR) devices, printers, and other networked devices will all generate in-home traffic intended for other devices within the home PON 140. Because the home PON 140 utilizes individual ONUs for each room or floor (i.e., eliminating the inefficiency of a router), all the in-home traffic from the home PON 140 will travel up the access PON network 100 to the CO, where it is immediately turned around and sent back down to the home PON 140 where it came from. This process is inefficient, can add delay, and poses a privacy risk to data that never required to leave the home PON 140.

To address this issue, in an embodiment, the gateway device 110 is configured to perform traffic switching, such that traffic from the home PON 140 destined to other points in the home PON 140 (i.e., in-home traffic, local traffic, or home PON traffic) can be kept in the home PON 140. In an embodiment, the gateway device 110 performs the traffic switching according to a bandwidth allocation map or schedule received from the OLT 102. The bandwidth allocation map indicates the time period (e.g., start time and duration) an ONU 116 of the home PON 140 and an ONU 108 of the access PON network 100 can transmit data upstream.

Figure 2:
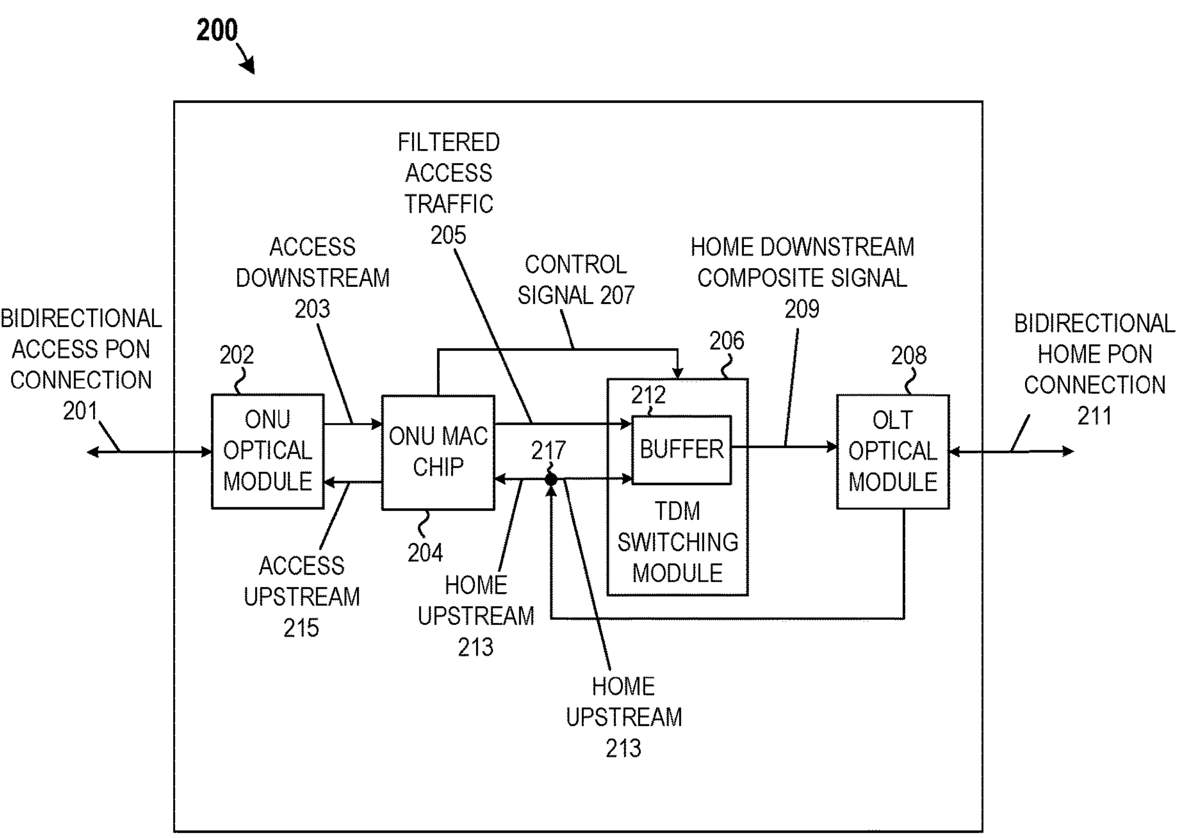
FIG. 2 is a diagram illustrating an ONU gateway device that performs in-home traffic switching in accordance with an embodiment of the present disclosure.

FIG. 2 is a diagram illustrating a gateway device 200 that performs in-home traffic switching in accordance with an embodiment of the present disclosure. The gateway device 200 includes an ONU optical module (or circuit) 202, an ONU media access control (MAC) chip 204, a TDM switching module (or circuit) 206, and an OLT optical module (or circuit) 208.

The ONU optical module 202 has a bidirectional access PON connection 201 to the access PON network 100 for sending and receiving optical signals on the access PON network 100 (i.e., to and from the OLT 102). The OLT optical module 208 has a bidirectional access PON connection 211 to the home PON 140 for sending and receiving optical signals on the home PON 140 (i.e., to and from the ONUs 116).

GPON adopts two multiplexing mechanisms for downstream and upstream. In downstream direction (e.g., from the OLT 102 to the downstream devices such as the ONUs 108 and ONUs 116), data packets are transmitted in a broadcast manner (i.e., the downstream signal includes the data for all downstream devices), but encryption is used to prevent eavesdropping. In upstream direction (e.g., from downstream devices to the OLT 102), data packets are transmitted in a Time Division Multiple Access (TDMA) manner (i.e., based on allotted timeslots) so that ONU upstream transmissions do not collide.

The ONU optical module 202 receives an access PON optical downstream signal from OLT 102 that includes a downstream header and access traffic (i.e., downstream data) for one or more of the ONUS 116 of the home PON 140. The access PON optical downstream signal from OLT 102 may also include access traffic for other ONUS 108 of the access PON network 100. The downstream header indicates which portion of the access PON optical downstream signal is intended for which downstream device. The downstream header also carries grant messages that include a BWMAP granting specific timeslots (e.g., Transmission Container (T-CONT), start and end {ALLOC_ID+Start+End}) for each granted upstream window in which an ONU 108 or ONU 116 can transmit data upstream. The OLT 102 calculates the BWMAP nearly in real time, and can dynamically recalculate the BWMAP every few milliseconds so that upstream timeslots can shrink or grow based on the distribution of upstream traffic loads. The allocation identifier (ALLOC_ID) is a 12-bit number that the OLT 102 assigns to an ONU (e.g., ONU 108 or ONU 116) to identify a traffic-bearing entity that is a recipient of upstream bandwidth allocations within that ONU. This traffic-bearing entity is also called T-CONT, which is an ONU object representing a group of logical connections that appear as a single entity for the purpose of upstream bandwidth assignment on the PON. Each ONU is assigned a default ALLOC_ID which is equal to that ONU's ONU-ID, and may be assigned additional ALLOC IDs as per the OLT's 102 discretion. The ONU-ID is an 8-bit identifier that the OLT 102 assigns to an ONU during ONU activation via Physical Layer Operation Administration and Maintenance (PLOAM) messages. The ONU-ID is unique across the PON (both the access PON network 100 and the home PON 140) and remains until the ONU is powered off or deactivated by the OLT 102. The ALLOC_ID field in the downstream header indicates the recipient of the bandwidth allocation (i.e., a particular T-CONT). The ONU optical module 202 converts the access PON optical downstream signal to an electrical signal (i.e., an access PON downstream electrical signal 203).

The access PON downstream electrical signal 203 is sent to the ONU MAC chip 204. The ONU MAC chip 204 analyzes the control information in the downstream header and filters the access PON downstream electrical signal 203 for the intended ONU (e.g., for an intended ONU 108 in FIG. 1) by removing or dropping the data intended for other ONUS 108 from the downstream signal to generate filtered access traffic 205. The filtered access traffic 205 is sent to the TDM switching module 206. In accordance with the disclosed embodiments, the ONU MAC chip 204 generates one or more control signals 207 to control the TDM switching module 206.

On the upstream side, the OLT optical module 208 receives a home upstream optical signal at the bidirectional access PON connection 211 from an ONU 116 over the home PON 140. The home upstream optical signal may include both in-home traffic for other devices in the home PON 140 and upstream access traffic to be sent to the OLT 102. The OLT optical module 208 converts the home upstream optical signal from an optical signal to a home upstream electrical signal 213. The OLT optical module 208 outputs the home upstream electrical signal 213 to a signal splitter 217, where the home upstream electrical signal 213 is copied. One copy of the home upstream signal 213 is sent to the ONU MAC chip 204. The second copy of the home upstream signal 213 is sent to the TDM switching module 206.

In an embodiment, the TDM switching module 206 is implemented using a two-port memory buffer 212, where two input ports (one input port for the filtered access traffic 205, and the other input port for the home upstream signal 213) can feed/store data into the buffer 212, and a single output port can read data from the buffer 212. The TDM switching module 206 has two states, a first state and a second state. In the first state, the first input port is selected and the filtered access traffic 205 (i.e., the access PON downstream) is written to the buffer 212. In the second state, the second input port is selected and the home upstream signal 213 is written to the buffer 212.

In an embodiment, the buffer 212 is organized on whole forward error correction (FEC) codewords, and only whole FEC codewords are stored and read from the buffer 212. FEC is a technique used for controlling errors in data transmission over unreliable or noisy communication channels. The central idea is the sender encodes the original message into codewords by adding redundant data, most often by using an error correction code. The added redundancy allows the decoder of the receiver to detect a limited number of errors that may occur in the message, and often to correct these errors without re-transmission, with the goal that the original message is recovered successfully at the output of the decoder. In an embodiment, to reduce FEC calculations, the state of the TDM switching module 206 is switched at the codeword boundaries. Similarly, in an embodiment, no FEC processing is needed at the gateway device 200, when the ONUS 116 send local traffic (in-home traffic) using whole codewords. The single output port reads the data from the buffer 212 in the order the data was written to the buffer 212 (i.e., first-in, first-out (FIFO)) to maintain the correct timing of the data timeslots.

The state of the TDM switching module 206 is controlled by the ONU MAC chip 204 using the one or more control signals 207. The ONU MAC chip 204 determines the state of the TDM switching module 206 (i.e., whether the TDM switching module 206 outputs the filtered access traffic 205 or the home upstream signal 213 to the OLT optical module 208) based on the control information in the downstream header, which indicates when there are gaps or available timeslots in between the filtered access traffic 205 (e.g., where data intended for other ONUS 116 are allocated). When there is access downstream data for the particular ONU, the ONU MAC chip 204 sends the control signal 207 to the TDM switching module 206 to switch to the first state for outputting the access downstream data to the OLT optical module 208. When there is not data for the particular ONU (e.g., where there is data for other ONUs), the ONU MAC chip 204 sends the control signal 207 to the TDM switching module 206 to switch to the second state for outputting the in-home traffic from the home upstream signal 213 to the OLT optical module 208. The output of the TDM switching module 206 is a home downstream composite signal 209 that includes both access downstream data for an ONU 116 and in-home traffic. The home downstream composite signal 209 is received at an input port of the OLT optical module 208.

In an embodiment, the timing of when the home upstream signal 213 containing the in-home traffic arrives at the TDM switching module 206 is controlled by the control information originated by the OLT 102 (e.g., using the BWMAP). The control information from the OLT 102 ensures that the in-home traffic portion of the home upstream signal 213 arrives at the TDM switching module 206 at about the same time as when there are available timeslots in between the filtered access traffic 205 so as to minimize the buffering of data (i.e., the BWMAP controls when each of the ONUS 116 can transmit upstream data). The OLT optical module 208 converts the home downstream composite signal 209 from an electrical signal to an optical signal and transmits the optical signal to the intended ONU 116 of the home PON 140.

Similarly, in an embodiment, the timing of when the copy of the home upstream signal 213 arrives at the ONU MAC chip 204 is controlled by the control information originated by the OLT 102. The control information from the OLT 102 ensures that the ONU MAC chip 204 minimizes any buffering of the home upstream signal 213. Based on the control information, the ONU MAC chip 204 removes the in-home traffic portion of the home upstream signal 213 to generate an access upstream signal 215. The access upstream signal 215 is output to the ONU optical module 202. The ONU optical module 202 converts the access upstream signal 215 from an electrical signal to an optical signal. The ONU optical module 202 transmits the access upstream signal 215 to the OLT 102 over the bidirectional access PON connection 201 in accordance with the timeslot allotted to the gateway device 200.

Thus, the OLT 102 can coordinate the timing of all the signals to avoid conflicts and reduce buffering at the gateway device 110 using the OLT's 102 grant scheduling. For example, the grant scheduling can instruct the ONU optical module 202 when to transmit the access PON optical upstream signal, instruct the ONU MAC chip 204 when to initiate the control signal 207 to change the state of the TDM switching module 206, and instruct the ONUS 116 when to transmit data upstream. When all the signals are coordinated correctly, conflicts are avoided, and the gateway device 110 does not have to store much data. In an embodiment, the grant scheduling would be implementing a 'just in time' style of operation. For instance, the grant to send the access upstream signal 215 up the access PON network 100 is received by the ONU optical module 202, just as the access upstream signal 215 arrives at the ONU optical module 202. This way, the access upstream signal 215 can proceed straight through the ONU optical module 202 with minimal to no delay or buffering. In accordance with the disclosed embodiments, the timing coordination is very fine-grained/precise (e.g., ~nanosecond level of accuracy).

Figure 3A:
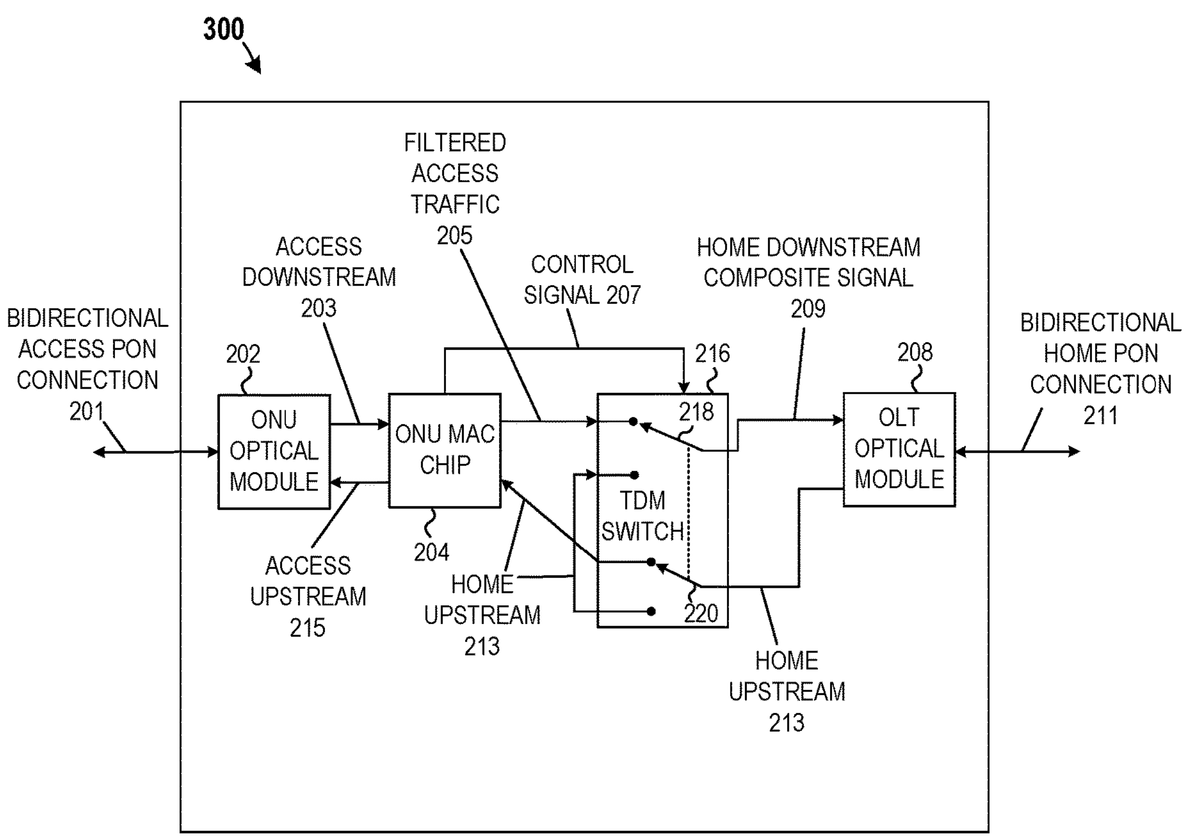
FIG. 3A is a diagram illustrating an ONU gateway device that performs in-home traffic switching in accordance with another embodiment of the present disclosure.

FIG. 3A is a diagram illustrating a gateway device 300 that performs in-home traffic switching in accordance with another embodiment of the present disclosure. The gateway device 300 includes the ONU optical module 202, the ONU MAC chip 204, and the OLT optical module 208, as described in FIG. 2, but uses a TDM switching module 216 to control the home upstream signal 213. The TDM switching module 216 uses an electronically controlled multiplexer switch, which can electrically connect one of the two input ports to the output port. For instance, in the depicted embodiment, the TDM switching module 216 includes a downstream input switch 218 and an upstream output switch 220. The downstream input switch 218 can electrically connect one of the two input ports to the downstream output port, which feeds into the OLT optical module 208. The upstream output switch 220 can cause the home upstream signal 213 to either be routed to one of the input ports, or be routed to an upstream output port of the TDM switching module 216.

As described above, the state of the downstream input switch 218 and the upstream output switch 220 is controlled by the ONU MAC chip 204 using the control signal 207 based on the control information (e.g., BWMAP) in the header of the access downstream signal received from the OLT 102. In the depicted embodiment, when both the downstream input switch 218 and the upstream output switch 220 are in the up position, the TDM switching module 216 outputs the filtered access traffic 205 (i.e., the access downstream signal for the particular ONU 116) to the OLT optical module 208 and outputs the home upstream signal 213 to the ONU MAC chip 214. Based on the control information, when there is no data for the particular ONU 116 in the filtered access traffic 205 and there is in-home traffic data in the home upstream signal 213, the ONU MAC chip 204 can send the control signal 207 to the TDM switching module 216 to switch both the downstream input switch 218 and the upstream output switch 220 to the down position. In the down position, the upstream output switch 220 directs the home upstream signal 213 to the second input port of the TDM switching module 216, and with the downstream input switch 218 in the down position, the in-home traffic data in the home upstream signal 213 is output to the OLT optical module 208. In the depicted embodiment, the downstream input switch 218 and the upstream output switch 220 are connected together with a dashed line to indicate that they both switch in unison. That is to say, both switches are either up or down together. In some embodiments, the TDM switching module 216 may include a small FIFO-like memory buffer (not depicted) to temporarily store any data to compensate for any data misalignments.

Figure 3B:
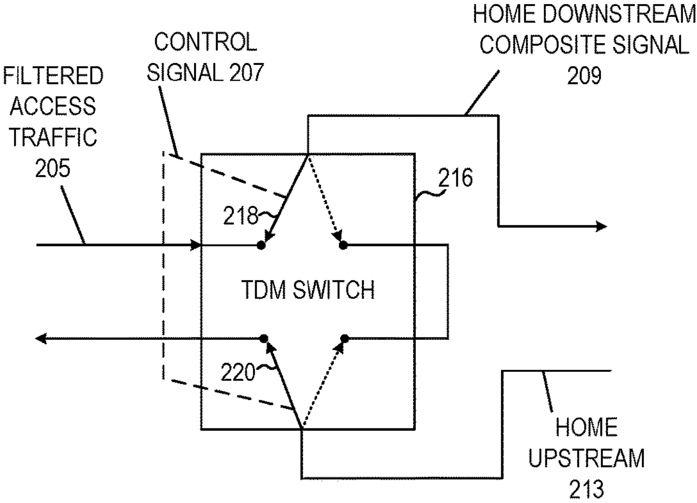
FIG. 3B is a diagram illustrating a TDM switching module in accordance with an embodiment of the present disclosure.

In an alternative embodiment, the TDM switching module 216 can be redesigned such that the downstream input switch 218 and the upstream output switch 220 switches from left to right, as illustrated in FIG. 3B, instead of up and down. In this embodiment, when both the downstream input switch 218 and the upstream output switch 220 are in a left position (i.e., pointing toward the left), the TDM switching module 216 outputs the filtered access traffic 205 to the OLT optical module 208, and outputs the home upstream signal 213 to the ONU MAC chip 214. When there is no data for the particular ONU 116 in the filtered access traffic 205 and there is in-home traffic data in the home upstream signal 213, the ONU MAC chip 204 can send the control signal 207 to the TDM switching module 216 to switch both the downstream input switch 218 and the upstream output switch 220 to the right position (as indicated by the dashed arrows). In the right position, the upstream output switch 220 redirects the home upstream signal 213 to the second input port of the TDM switching module 216, and with the downstream input switch 218 in the right position, the in-home traffic data in the home upstream signal 213 is output to the OLT optical module 208.

One advantage of the gateway device 300 over the gateway device 200 is that the home upstream signal 213 does not need to be copied. Another advantage is that the ONU MAC chip 204 can filter out the in-home traffic from the home upstream signal 213 using the TDM switching module 216 instead of having to filter the in-home traffic out of the home upstream signal 213 at the ONU MAC chip 204. One disadvantage of the gateway device 300 over the gateway device 200 is that the TDM switching module 216 may be more complex to implement and cost more than the TDM switching module 206.

Figure 4:
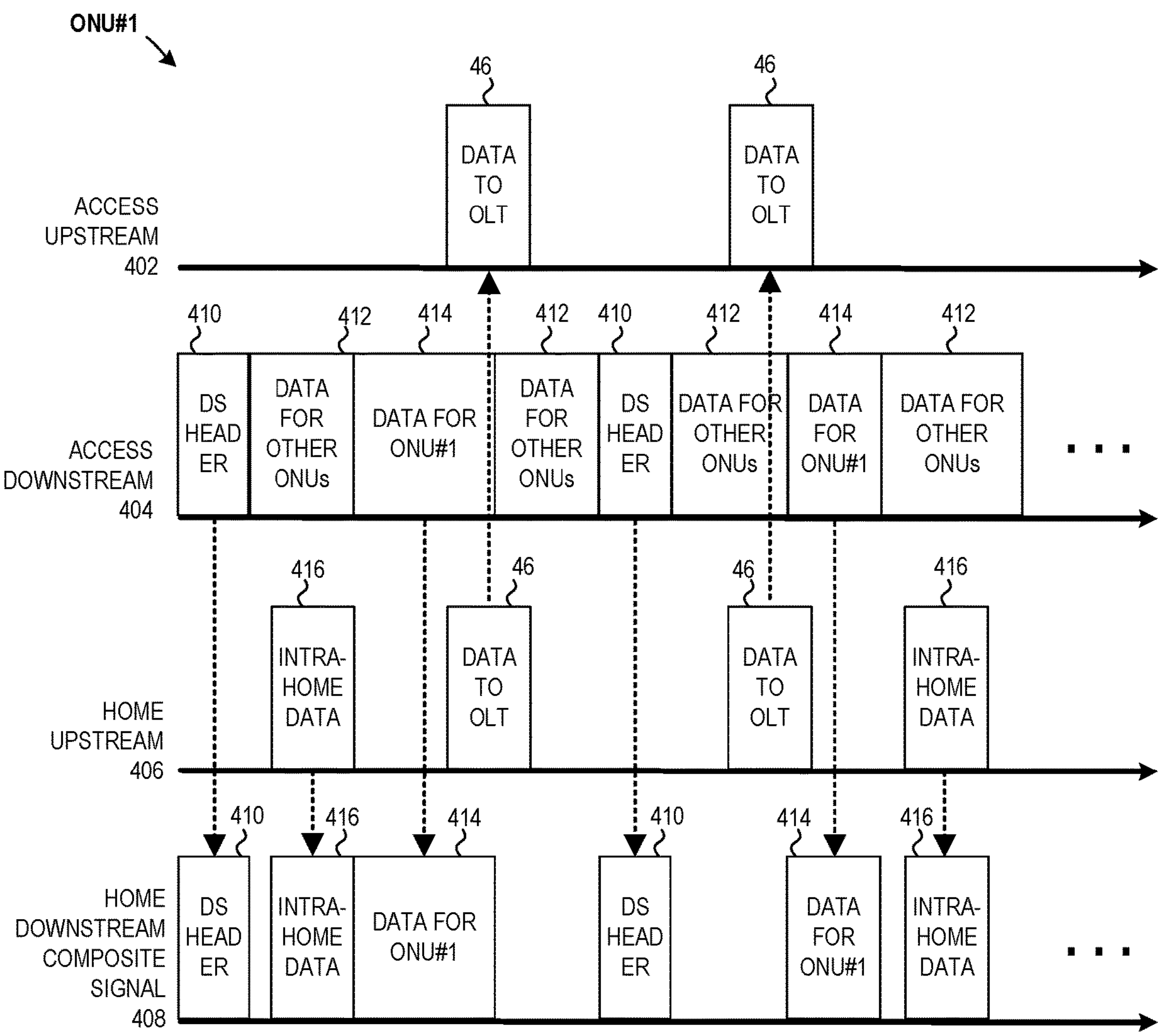
FIG. 4 is a diagram illustrating the timing arrangement of four signals being received and sent by an ONU gateway device in accordance with an embodiment of the present disclosure.

FIG. 4 illustrates the timing arrangement of the four signals coming in and out of the intelligent gateway (e.g., the gateway device 200 in FIG. 2 or the gateway device 300 in FIG. 3) in accordance with an embodiment of the present disclosure. In the depicted embodiment, the intelligent gateway is operating as ONU #1 on the access PON (e.g., ONU #1 can be any ONU 108 of the access PON network 100 in FIG. 1).

As shown in FIG. 4, the four signals are an access upstream signal 402, an access downstream signal 404, a home upstream signal 406, and a home downstream composite signal 408. The four signals are graphed with respect to the time at the gateway (as shown by the horizontal arrows). There is no significant propagation delay between the four signals because all four signals are physically located at the gateway.

The access downstream signal 404 is the signal received at the ONU of the gateway from the OLT 102. The access downstream signal 404 is a normal PON signal that has in each frame a downstream (DS) header 410 and data destined to various ONUS 108 (depicted in the access downstream signal 404 as data for other ONUS 412 and data for ONU #1 414). The dashed arrows in FIG. 4 illustrate how the data is forwarded from one signal to another, which is controlled by the information in the DS header 410. The DS header 410 contains the bandwidth map that gives time allocations to both the gateway and all the subtending home ONUS of the gateway. The bandwidth map in the DS header 410 controls the timing of when to transfer the DS header 410 from the access downstream signal 404, the intra-home data 416 from the home upstream signal 406, and the data for ONU #1 414 from the access downstream signal 404 to the home downstream composite signal 408. Additionally, the bandwidth map in the DS header 410 controls the timing of when to transfer the data to the OLT 418 from the home upstream signal 406 to the access upstream signal 402.

For instance, as depicted in FIG. 4, based on the bandwidth map, as the access downstream signal 404 is received by the ONU #1, the DS header 410 is passed through the TDM switching module to become part of the home downstream composite signal 408. During the periods that the access downstream signal 404 contains the data for other ONUS 412 (e.g., data that is not intended the customer location 120 in FIG. 1), the TDM switching module switches states, and the intra-home data 416 from the home upstream signal 406 is passed through the TDM switching module to be part of the home downstream composite signal 408. When the access downstream signal 404 contains data for ONU #1 414, the TDM switching module switches states, and the data for ONU #1 414 is passed from the access downstream signal 404 through the TDM switching module to become part of the home downstream composite signal 408. Any data to OLT 418 in the home upstream signal 406 becomes part of the access upstream signal 402. The timing of the data to OLT 418 is also controlled by the control information in the DS header 410 to avoid any collisions when transmitting the access upstream signal 402 to the OLT.

As shown in FIG. 4, there are two types of allocations in this scheme. There are those that enable intra-home data 416, and those that enable data to the OLT 418. The intra-home data 416 allocations are arranged so that they do not conflict with either the DS header 410 or the incoming data for ONU #1 414. Due to these restrictions, the intra-home data 416 can then be hair-pinned (i.e., u-turned) at the intelligent gateway, and rerouted from the home upstream signal 406 to the home downstream composite signal 408 without buffering or delay. The data to OLT 418 allocations are arranged so that they do not conflict with any of the intra-home data 416 transmissions, or with any transmissions from other ONUS. Due to these restrictions, the data to OLT 418 can be forwarded from the home upstream signal 406 to ONU #1's access upstream signal 402 without buffering or delay.

Figure 5:
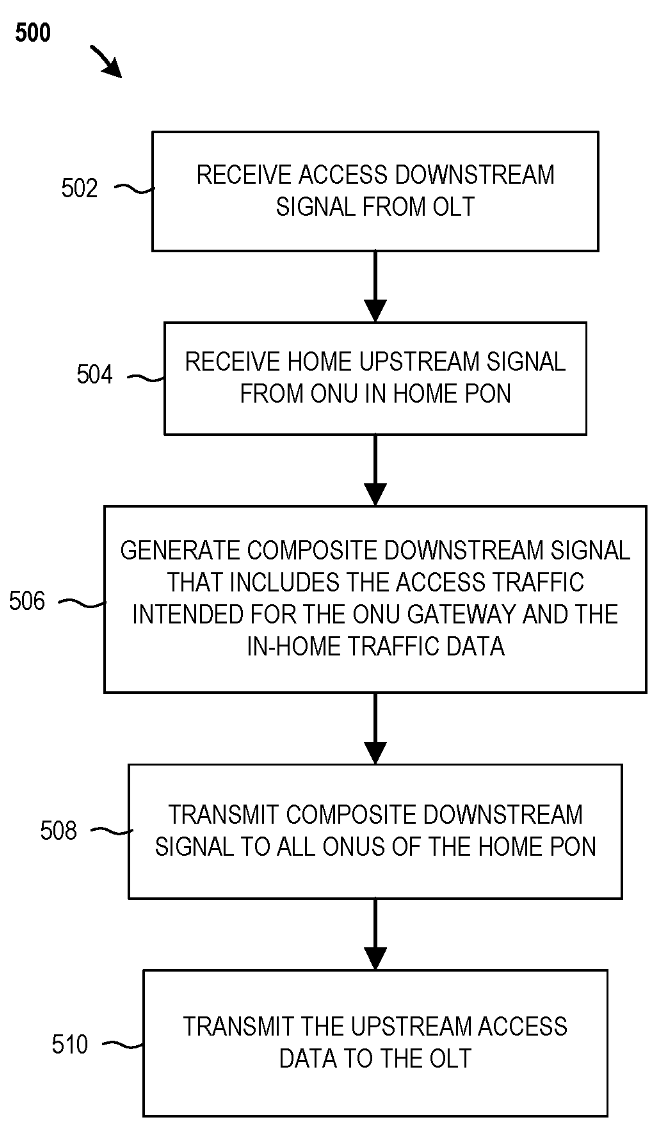
FIG. 5 is a flowchart illustrating a process performed by an ONU gateway for intelligent rerouting of in-home traffic of a home PON in accordance with an embodiment of the present disclosure.

FIG. 5 is a flowchart illustrating a process 500 performed by an ONU gateway, such as gateway device 110 in FIG. 1, for intelligent rerouting of in-home traffic of a home PON in accordance with an embodiment of the present disclosure. The ONU gateway is a gateway or bridge between an access PON and the home PON. At step 502, the ONU gateway receives an access downstream signal from an OLT. The access downstream signal includes control information (e.g., BWMAP in header), access traffic intended for the ONU gateway, and access traffic not intended for the ONU gateway.

At step 504, the ONU gateway receives a home PON upstream optical signal from an ONU of the home PON. The home PON upstream optical signal includes in-home traffic data (i.e., data intended to be communicated between devices in the home PON) and upstream access data (i.e., data intended for the OLT).

At step 506, the ONU gateway generates a composite downstream signal that includes the access traffic intended for the ONU gateway and the in-home traffic data. In an embodiment, the ONU gateway analyzes the control information in the downstream header to control a TDM switch to generate the composite downstream signal such that the access traffic intended for the ONU gateway is selected when the TDM switch is in a first state and the in-home traffic data is selected when the TDM switch is in a second state. In an embodiment, the ONU gateway utilizes a bandwidth timeslot previously allotted to the access traffic not intended for the ONU gateway for inserting the in-home traffic data in the composite downstream signal.

At step 508, the ONU gateway transmits the composite downstream signal to all ONUS of the home PON. At step 510, the ONU gateway transmits the upstream access data from the home upstream signal to the OLT over the access PON.

Accordingly, the disclosed embodiments provide various systems and methods for providing an intelligent network gateway between an access PON and a home PON that is able to provide fiber to the room or floors (i.e., a complete in-home fiber network) while eliminating the inefficiency of having in-home traffic routed all the way back to the OLT and then back to the home. In accordance with the disclosed embodiments, the gateway ONU is intelligently controlled so that when there is access PON traffic needed by the ONUS in the home PON, the gateway ONU lets the access PON traffic through. But, when there is no access PON traffic, then the gateway ONU can send the in-home traffic from the home PON upstream signal back into the home PON. It is during these times when one room ONU in the home PON can communicate with other ONUS in the home PON. Essentially, the local in-home PON traffic pre-empts the downstream signal.

In an embodiment, to make this network operate properly, a TDM switching module of the ONU gateway is coordinated with both the access PON traffic and all the home ONUS. The coordination is performed at the OLT during calculation of the bandwidth allocation for each of the ONU's that are downstream. In an embodiment, the OLT can control the ONU gateway and the home ONUS using the usual BWMAP messages found in all TDMA PONs. In this way, the ONU gateway remains fairly simple, and avoids nearly all of the usual OLT processing functions.

Certain embodiments may be implemented as a system, an apparatus, a method, and/or a computer program product.

The computer program product may include a computer readable storage medium (or media) having computer readable program instructions thereon for causing a processor to carry out aspects of the present disclosure. The computer readable storage medium may be a tangible device that can retain and store instructions for use by an instruction execution device.

Figure 6:
FIG. 6 is a diagram illustrating a system in accordance with an embodiment of the present disclosure.
Figure 6:
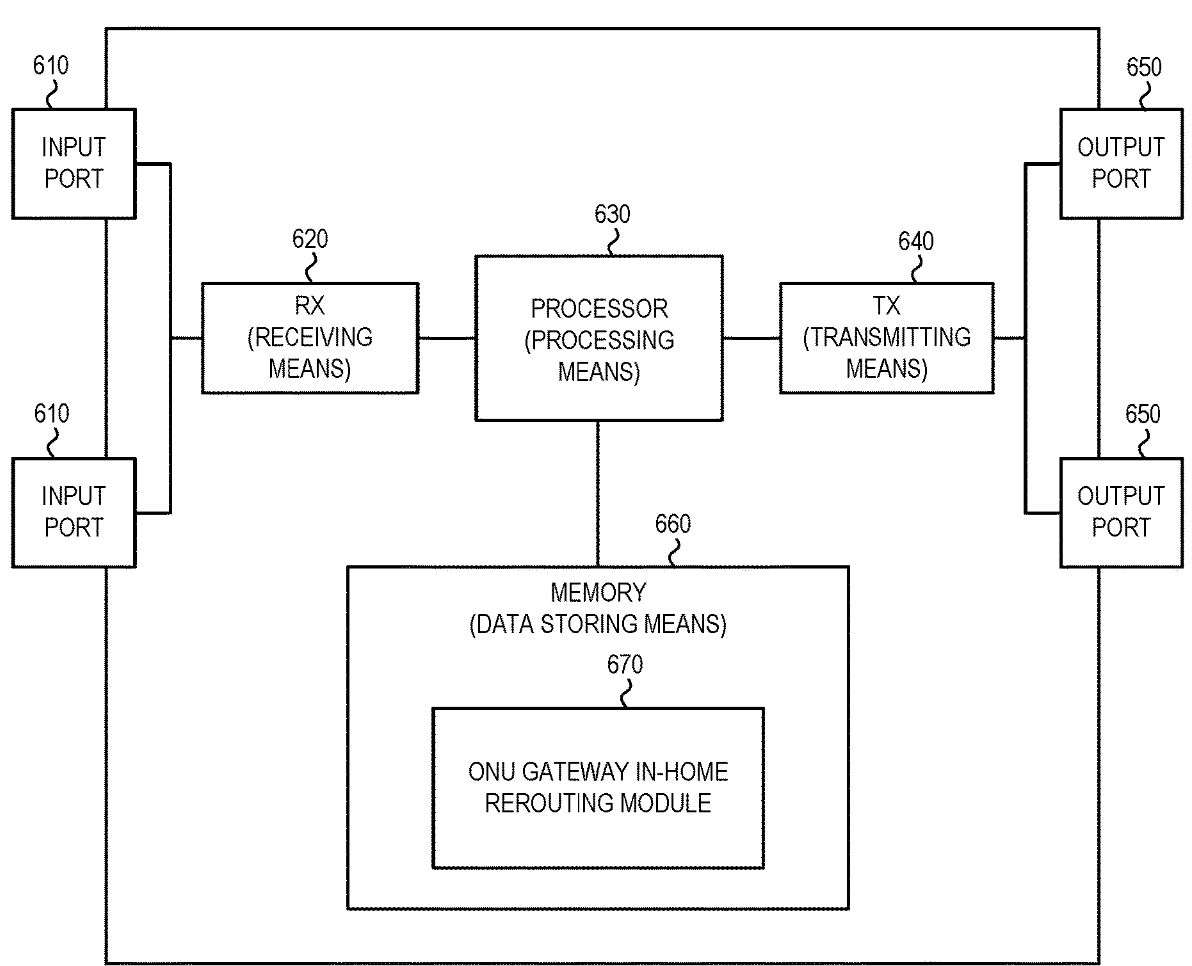

FIG. 6 is a diagram illustrating a system 600 in accordance with an embodiment of the present disclosure. The system 600, or portions thereof, may be used to implement various embodiments of an intelligent ONU gateway (i.e., the gateway device 110, 200, or 300) as disclosed herein, or one or more components of an intelligent ONU gateway, such as, but not limited to, an ONU optical module, an OLT optical module, and/or a MAC chip. In some embodiments the system 600 may be integrated on a single chip such as a system on a chip (SOC).

The system 600 includes a receiver unit (RX) 620 (i.e., a receiver) or receiving means for receiving data via one or more input ports 610. The system 600 also includes a transmitter unit (TX) 640 (i.e., a transmitter) or transmitting means for transmitting or forwarding data out of one or more output ports 650. In some embodiments, the RX 620 and the TX 640 may be combined into a single transceiver. Additionally, an input 610 and output port 650 may be combined into a bidirectional port.

The system 600 includes a memory 660 or data storing means for storing the instructions and various data. The memory 660 can be any type of or combination of memory components capable of storing data and/or instructions. For example, the memory 660 can include volatile and/or non-volatile memory such as read-only memory (ROM), random access memory (RAM), ternary content-addressable memory (TCAM), and/or static random-access memory (SRAM). The memory 660 can also include one or more disks, tape drives, or solid-state drives. In some embodiments, the memory 660 can be used as an over-flow data storage device or buffer to store programs when such programs are selected for execution, and to store instructions and data that are read during program execution.

The system 600 has one or more processors 630 or other processing means to process instructions. In some embodiments, the processor 630 may be a central processing unit (CPU) chip having one or more processing cores, a field-programmable gate array (FPGA), an application specific integrated circuit (ASIC), and/or a digital signal processor (DSP). The processor 630 is communicatively coupled via a system bus with the ingress ports 610, RX 620, TX 640, egress ports 650, and memory 660. The processor 630 can be configured to execute instructions stored in the memory 660, such as executing an ONU gateway in-home rerouting module 670. Thus, the processor 630 provides a device for performing any computational, comparison, determination, initiation, or configuration steps, or any other action corresponding to the claims when the appropriate instruction is executed by the processor. In some embodiments, the memory 660 can be memory that is integrated with the processor 630.

Although not depicted, in certain embodiments the system 600 may include other components in addition to or in lieu of the one or more of the components depicted in FIG. 6. For instance, in some embodiments the system 600 may include an optical to electrical signal converter and/or an electrical to optical signal converter. Additionally, the system 600 may include one or more multiplexer switches for redirecting the flow of a signal.

In one embodiment, the memory 660 stores the ONU gateway in-home rerouting module 670. The ONU gateway in-home rerouting module 670 includes data and executable instructions for implementing the disclosed embodiments. For instance, the ONU gateway in-home rerouting module 670 can include instructions for implementing the methods described in FIG. 5. The inclusion of the ONU gateway in-home rerouting module 670 provides a technical improvement to the functionality of the system 600 by enabling the system 600 to reroute in-home traffic from a home PON back to the home PON without sending the in-home traffic needlessly further upstream, thereby improving the efficiency and security of the overall network.

In an example embodiment, the system 600 includes a downstream reception module receiving an access PON downstream optical signal from an optical line terminal (OLT), the access PON downstream optical signal comprising access traffic intended for the ONU gateway and access traffic not intended for the ONU gateway, an upstream reception module receiving a home PON upstream optical signal from an ONU of the home PON, the home PON upstream optical signal comprising in-home traffic data and upstream access data, a composite module generating a composite downstream signal comprising the access traffic intended for the ONU gateway and the in-home traffic data, and a transmission module transmitting the composite downstream signal to all ONUS of the home PON. In some embodiments, the system 600 may include other or additional modules for performing any one of or a combination of steps described in the embodiments. Further, any of the additional or alternative embodiments or aspects of the method, as shown in any of the figures or recited in any of the claims, are also contemplated to include similar modules.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical network unit (ONU) gateway configured to couple an access passive optical network (PON) to a home PON, the ONU gateway comprising:

an ONU configured to convert an access PON downstream optical signal to an access PON downstream electrical signal comprising first access traffic and second access traffic, the first access traffic intended for the ONU gateway and the second access traffic is not intended for the ONU gateway;

an optical line terminal (OLT) configured to convert a home PON upstream optical signal to a home PON upstream electrical signal comprising in-home traffic data and upstream access data;

an ONU media access control (MAC) chip coupled to the ONU, the ONU MAC chip configured to filter the access PON downstream electrical signal and remove the second access traffic to generate a filtered access traffic signal; and a time-division multiplexing (TDM) switching circuit configured to receive one or more control signals from the ONU MAC chip to instruct the TDM switching circuit to generate a composite downstream electrical signal comprising the first access traffic and the in-home traffic data, the OLT is configured to convert the composite downstream electrical signal to a composite downstream optical signal and transmit the composite downstream optical signal to all ONUs of the home PON.

2. The ONU gateway of claim 1, wherein the TDM switching circuit comprises a first input port and a second input port, the first input port configured to receive the filtered access traffic signal, the second input port configured to receive the home PON upstream electrical signal.

3. The ONU gateway of claim 2, wherein the TDM switching circuit selects data from the first input port or the second input port to generate the composite downstream electrical signal based on the one or more control signals.

4. The ONU gateway of claim 1, wherein the one or more control signals from the ONU MAC chip are based on bandwidth allocation control information included in the access PON downstream optical signal from an OLT.

5. The ONU gateway of claim 3, wherein the one or more control signals from the ONU MAC chip instruct the TDM switching circuit to select data from the second input port during a bandwidth timeslot previously allotted to the second access traffic in the access PON downstream optical signal, such that the composite downstream electrical signal utilizes the bandwidth timeslot allotted to the second access traffic for carrying the in-home traffic data.

6. The ONU gateway of claim 1, wherein the ONU MAC chip receives a copy of the home PON upstream electrical signal comprising the in-home traffic data and the upstream access data, the ONU MAC chip configured to remove the in-home traffic data from the copy of the home PON upstream electrical signal to generate an access upstream electrical signal comprising the upstream access data.

7. The ONU gateway of claim 6, wherein the ONU converts the access upstream electrical signal to an access upstream optical signal, and transmits the access upstream optical signal to the OLT.

8. The ONU gateway of claim 6, wherein the OLT is configured to receive the home PON upstream optical signal from an ONU of the home PON.

9. The ONU gateway of claim 1, wherein the TDM switching circuit is implemented using an electronically controlled multiplexer switch, wherein the TDM switching circuit electrically connects one of two input ports to an output port.

10. The ONU gateway of claim 1, wherein the TDM switching circuit is implemented using a memory buffer having two input ports and one output port, where the two input ports store data into the memory buffer, and the one output port reads out data from the memory buffer.

11. The ONU gateway of claim 10, wherein the memory buffer is organized on whole forward error correction (FEC) codewords, and only whole FEC codewords are stored and read from the two input ports of the memory buffer.

12. A method implemented by an optical network unit (ONU) gateway configured to couple an access passive optical network (PON) and a home PON for rerouting in-home traffic data back to the home PON, the method comprising:

receiving an access PON downstream optical signal from an optical line terminal (OLT), the access PON downstream optical signal comprising first access traffic and second access traffic, the first access traffic intended for the ONU gateway, and the second access traffic is not intended for the ONU gateway;

receiving a home PON upstream optical signal from an ONU of the home PON, the home PON upstream optical signal comprising in-home traffic data and upstream access data;

generating a composite downstream signal comprising the first access traffic and the in-home traffic data; and transmitting the composite downstream signal to all ONUs of the home PON.

13. The method of claim 12, wherein the generating the composite downstream signal comprises analyzing control information included in the access PON downstream optical signal and utilizing the control information to generate the composite downstream signal.

14. The method of claim 13, wherein the composite downstream signal utilizes a bandwidth timeslot allotted to the second access traffic for carrying the in-home traffic data.

15. The method of claim 12, wherein the generating the composite downstream signal comprises controlling a time-division multiplexing (TDM) switch to generate the composite downstream signal.

16. The method of claim 15, wherein the first access traffic is selected when the TDM switch is in a first state, and the in-home traffic data is selected when the TDM switch is in a second state.

17. The method of claim 16, further comprising transmitting the upstream access data to the OLT.

18. A system comprising:

a memory storing instructions;

a receiver for receiving signals;

a transmitter for transmitting signals; and one or more processors coupled to the memory, the one or more processors configured to execute the instructions to cause the system to:

receive an access passive optical network (PON) downstream optical signal comprising first access traffic intended for the system;

receive a home PON upstream optical signal comprising in-home traffic data;

generate a composite downstream signal comprising the first access traffic and the in-home traffic data; and transmit the composite downstream signal.

19. The system of claim 18, wherein the generating the composite downstream signal comprises analyzing control information included in the access PON downstream optical signal and utilizing the control information to generate the composite downstream signal.

20. The system of claim 18, wherein the composite downstream signal utilizes a bandwidth timeslot allotted to second access traffic for carrying the in-home traffic data, wherein the second access traffic is not intended for the system.

* * * * *